United States Patent [19]

Daly et al.

[11] 4,031,771

[45] June 28, 1977

[54] VEHICLE REAR-VIEW MOUNTING ARRANGEMENT

[75] Inventors: Daniel Daly, Chertsey; Kenneth Paul Davis, Harlington; Charles Arthur Boughtflower, Bourne End, all of England

[73] Assignee: Magnatex Limited, Heathrow, England

[22] Filed: Oct. 28, 1975

[21] Appl. No.: 626,124

[30] Foreign Application Priority Data

Nov. 4, 1974 United Kingdom ............. 47698/74

[52] U.S. Cl. .................................. 74/479; 74/509; 248/479
[51] Int. Cl.² ..................... F16D 11/00; A47G 1/24
[58] Field of Search ............ 74/479, 504, 509, 511; 248/479, 484, 485

[56] References Cited

UNITED STATES PATENTS

| | | | |
|---|---|---|---|
| 2,260,597 | 10/1941 | Beattie | 248/485 X |
| 2,315,260 | 3/1943 | Lancaster | 74/479 |
| 2,674,922 | 4/1954 | Robinson | 74/479 |
| 2,713,810 | 7/1955 | Hill | 74/509 |
| 2,919,599 | 1/1960 | Milton et al. | 74/479 |

Primary Examiner—Allan D. Herrmann
Attorney, Agent, or Firm—Brisebois & Kruger

[57] ABSTRACT

The orientation of a vehicle rear-view mirror carried by a mirror support member is adjusted from inside a vehicle about a horizontal axis by turning a tubular bearing member, to which the mirror support member is hinged, about its axis by rotating a first control member and, independently, about a generally vertical axis defined by the axis of the hinge by moving a push member axially in the passage in the tubular bearing member by rotating a second control member.

6 Claims, 6 Drawing Figures

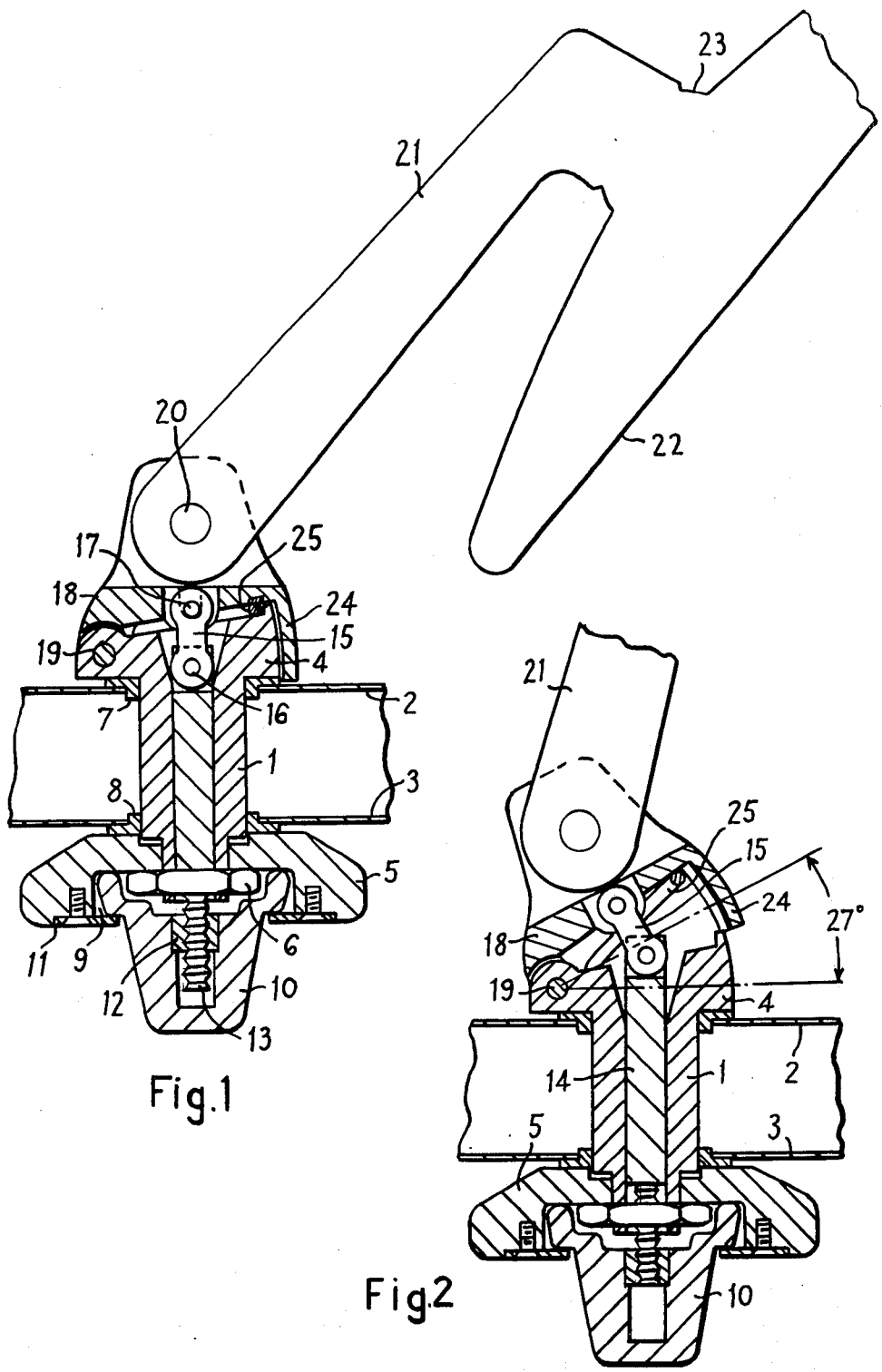

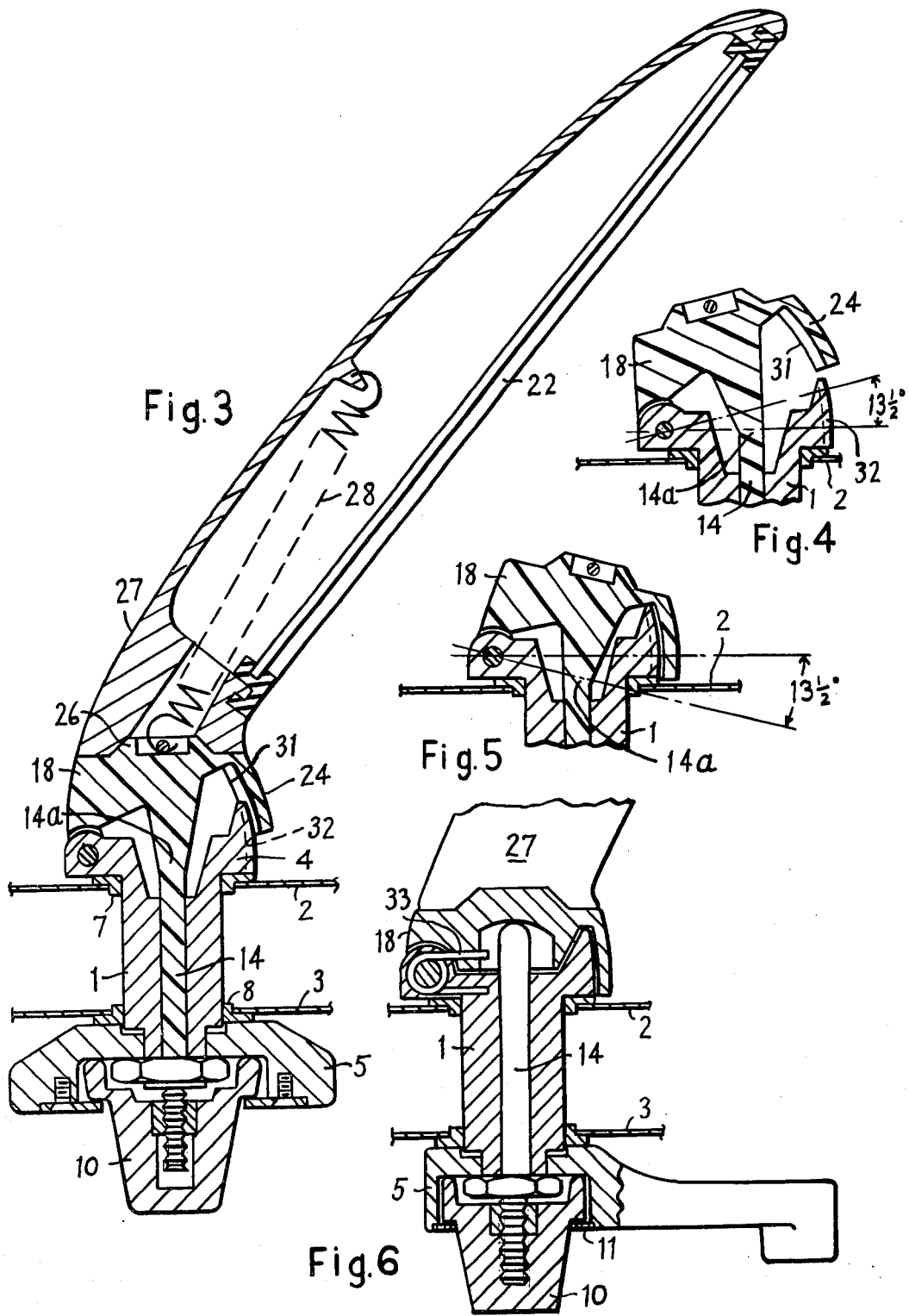

VEHICLE REAR-VIEW MOUNTING ARRANGEMENT

BACKGROUND OF THE INVENTION

1. Field of the Invention

This invention relates to a mounting arrangement for mounting a vehicle rear-view mirror on the outside of a vehicle door or other body part and having actuating means extending through the door or body part which is connected to manually-actuable control means situated on the inside of the door or body part for adjusting the orientation of the mirror about both vertical and horizontal axes from inside the vehicle, of the kind described in British patent specification No. 1,321,158.

2. Description of Prior Art

In British patent specification No. 1,321,158 there is described a rear-view mounting arrangement in which a mirror support can be adjusted about the generally vertical axis of a hinge which is rigidly attached to a part of the vehicle body, by means of an operating lever connected to the mirror support and extending into the interior of the vehicle and can be adjusted through a limited angle about a horizontal pivot axis by the same operating lever.

SUMMARY OF THE INVENTION

One object of the present invention is to provide a rear-view mirror mounting arrangement of the kind referred to in which fine adjustment of the mirror support member in particular about a vertical axis can be achieved.

According to the invention, a mounting arrangement of the kind referred to comprises a tubular bearing member adapted to be mounted to extend through and to be turnable in the door or other body part, said bearing member having a mirror support member hinged to its outer end for hinging about an axis extending transversely to the axis of said bearing member and being connected at its inner end to a first rotatable control member which, when rotated, turns the bearing member about its axis, and a push member axially movable in the passage in the bearing member and coupled at its inner end by a screw thread to a second rotatable control member which is axially captive with the inner end of the bearing member so that rotation of said second control member produces axial movement of said push member and thereby hinging movement of the mirror support member.

In this specification reference to the "outer end" of a component of the mounting arrangement means that end of the component which, when the mounting arrangement is in use, is outside or towards the outside of the vehicle body, and the "inner end" means the opposite end of the component.

The rotatable control members may surprise knobs, handles or levers.

With the mounting arrangement according to the invention a rear-view mirror carried from the mirror support member can be adjusted about a horizontal axis by turning the bearing member about its axis by the first control member and, independently, about a generally vertical axis defined by the axis of the hinge means, by rotating the second control member to move the push member axially outwards or inwards.

The tubular bearing member may be held in its adjusted position by friction or by locking means.

The push member may comprise a rod which may be connected to the mirror support member by a link system, connected to the mirror support member by a link system, or comprise a rod which may be connected to or integral with the mirror support member and which may itself be flexible for at least part of its length, to allow for the angular movement of the mirror support member about its hinge. Or the support member may simply be held in contact with the outer end of the rod by a spring.

BRIEF DESCRIPTION OF THE DRAWINGS

FIG. 1 is a section through one embodiment of a mounting arrangement according to the invention with the mirror support member in its inner position, FIG. 2 is a view similar to FIG. 1 but with the mirror support member in its outer position, FIG. 3 is a section through another embodiment with the mirror support member in its mean position, FIGS. 4 and 5 are fragmentary sections of the embodiment of FIG. 3 with the mirror support member in its outer and inner positions respectively, and FIG. 6 is a section of another embodiment with the mirror support member in the inner position.

DESCRIPTION OF THE PREFERRED EMBODIMENTS

Referring to FIGS. 1–2 of the drawings, the mirror mounting arrangement shown comprises a tubular bearing member 1 extending between the outer and inner skins 2, 3 respectively of a vehicle door. The bearing member is provided with a head portion 4 at its outer end and to its inner end is screwed a first control knob 5, which is locked in place by a locknut 6. Between the underside of the head portion 4 and the outer skin 2 and between the underside of the control knob 5 and the inner skin 3 are positioned friction washers 7, 8 respectively so that the bearing member 1 can be turned by the control knob 5 against the frictional resistance provided by these friction washers. The degree of friction may be adjusted by adjusting the position at which the control knob 5 is locked on the threaded end of the bearing member by the locknut 6.

Held captive in a recess 9 in the outer surface of the knob 5 is the rim of a second control knob 10, which is retained in the recess by a retaining plate 11 secured by screws to the knob 5.

The knob 10 has an internal bore in which is secured a threaded nut 12 in threaded engagement with the threaded end 13 of a rod 14 which is axially slideable in the passage through the bearing member 1. At its outer end, the rod 14 is connected by a link 15 and pivot pins 16, 17 to a mirror support member 18 which is hinged to the head 4 by a hinge pin 19 which extends transversely to the axis of the passage in the bearing member 1 and to one side of the said axis so that by moving the rod 14 axially, by rotating the knob 10, the mirror support member 18 can be turned around the hinge 19 from an inner position (shown in FIG. 1) in which the mirror support member lies close against the heat 4 to an outer position (shown in FIG. 2) in which the mirror support member is inclined away from the head 4. Rotation of the rod 4 due to rotation of the knob 10 is prevented by the pivot pins 16, 17 and the link 15, Secured to the mirror support member 18 by a bolt 20 is an arm 21 which carries a rear-view mirror head 22, whereby the position of the arm 21 relative to the support member 18 may be adjusted. Preferably the opposing faces of the arm 21 and the member 18 are formed with interengaging rings of ratchet teeth which are urged into engagement by a spring compressed by the bolt 20 whereby, if the mirror should be accidentally struck, the arm 21 and mirror 22 can ratchet forwards or backwards about the bolt, thereby reducing risk of damage to the person or object struck and to the mirror. If desired, a further adjustment means, known per se, may be provided at 23 between the mirror 22 and the arm 21.

The mirror support member 18 may be provided with a skirt 24 to cover the gap between the head 4 and the support member 18 when the latter is in its outer position. To take up any slack, a spring 25 may be provided which acts on the inner surface of the mirror support member 18 to urge the latter towards its outer position.

By rotating the first control knob 5, the orientation of the mirror 22 can be adjusted about a horizontal axis defined by the axis of the bearing member 1, and by rotating the second control knob 10, the mirror can be adjusted about a generally vertical axis defined by the axis of the hinge 19. The arrangement described allows the mirror to be adjusted through an angle of approximately 27° about this generally vertical axis.

FIGS. 3, 4 and 5 show another embodiment in which the rod is moulded integrally with the mirror support member 18 of a plastics material is sufficiently flexible to allow the rod to flex at a position 14a (or at some selected point of reduced cross-section) during movement of the mirror support member between its outer position shown in FIG. 8 and its inner position shown in FIG. 9.

In any of the embodiments herein described, the skirt portion 24 of the support member 18 may be guided relative to the head 4, for example by providing the inner surface of the skirt member 24 with a key 31 slideable in a keyway 32 in the head 4 as shown in FIG. 3.

FIG. 3 also shows an alternative arrangement for supporting the mirror from the mirror support member 18 which enables the mirror to rock and/or turn relative to the support member in the event of the mirror being accidentally struck and to be readily restored, either automatically or manually, to its indexed position on the mirror support mmember. In the embodiment shown, the indexing means is similar to that described in British patent specification No. 746,275 and comprises a pyramidal projection 26 on the outer surface of the mirror support member 18 which locates in a complementary cavity in the end of the mirror arm or mirror head 27, the support member 18 and the part 27 being normally held together in the indexed position by a spring 28.

FIG. 6 shows another embodiment in which the mirror support member 18 is spring loaded by a spring 33 to its inner position so that it bears against the outer end of the rod 14. The inner surface of the mirror support member against which the end of the rod 14 bears is curved to provide smooth movement during adjustment of the mirror support member between its outer and inner positions. In this embodiment the first control member 5 is shown as a lever.

Instead of relying only on the friction of the friction washers 7, 8 for holding the first control knob or lever in the adjusted position any suitable means may be provided for locking the first control knob or lever in its adjusted position.

We claim:

1. A mounting arrangement for mounting a vehicle rear-view mirror on the outside of a part of a vehicle body, comprising:
  a. a tubular bearing member adapted to be mounted to extend through and be turnable in the body part and having an outer and an inner end and defining a passage extending therethrough,
  b. a mirror support member,
  c. hinge means having an axis extending transversely to the axis of said bearing member and connecting said mirror support member to the outer end of said bearing member for hinging about the axis of the hinge means,
  d. a first rotatable control member connected to the inner end of the bearing member, for turning the bearing member about its axis,
  e. a push member axially movable in the passage in said bearing member, said push member comprising a rod which is flexible for at least a part of its length, said rod being screw-threaded at its inner end and having its outer end rigid with the mirror support member,
  f. a second rotatable control member,
  g. screw-thread means coupling the inner end of said push member to said second control member,
  h. means holding said second control member axially captive with the inner end of said bearing member, and
  i. means operative in response to axial movement of said push member to cause the mirror support member to hinge about said hinge means.

2. A mounting arrangement as claimed in claim 1, wherein the push member is a rod which is flexible for at least a part of its length, said rod being screw-threaded at its inner end and having its outer end connected to the mirror support member.

3. A mounting arrangement as claimed in claim 1, wherein the bearing member is provided at its outer end with an enlarged head and at its inner end with a screw-thread onto which the first control member is screwed and secured in a desired position by a lock nut.

4. A mounting arrangement as claimed in claim 1, wherein the second control member is rotatable relative to but held axially captive by the first control member and has an internal thread in threaded engagement with the screw-thread on the inner end of the rod.

5. A mounting arrangement for mounting a vehicle rear-view mirror on the outside of a part of a vehicle body, comprising:
  a. a tubular bearing member adapted to be mounted to extend through and be turnable in the body part and having an outer and an inner end and defining a passage extending therethrough,
  b. a mirror support member,
  c. hinge means having an axis extending transversely to the axis of said bearing member and connecting said mirror support member to the outer end of said bearing member for hinging about the axis of the hinge means,
  d. a first rotatable control member connected to the inner end of the bearing member, for turning the bearing member about its axis,
  e. a push member axially movable in the passage in said bearing member, the push member comprising a rod, the mirror support member being held against the outer end of the rod by a spring and the first control member being in the form of a lever,
  f. a second rotatable control member, g. screw-thread means coupling the inner end of said push member to said second control member,
h. means holding said second control member axially captive with the inner end of said bearing member, and
i. means operative in response to axial movement of said push member to cause the mirror support member to hinge about said hinge means.

6. A mounting arrangement for mounting a vehicle rear-view mirror on the outside of a part of a vehicle body, comprising:
a. a tubular bearing member adapted to be mounted to extend through and be turnable in the body part and having an outer and an inner end and defining a passage extending therethrough,
b. a mirror support member,
c. hinge means having an axis extending transversely to the axis of said bearing member and connecting said mirror support member to the outer end of said bearing member for hinging about the axis of the hinge means,
d. a first rotatable control member connected to the inner end of the bearing member, for turning the bearing member about its axis,
e. a push member axially movable in the passage in said bearing member,
f. a second rotatable control member,
g. screw-thread means coupling the inner end of said push member to said second control member,
h. means holding said second control member axially captive with the inner end of said bearing member, and
i. means operative in response to axial movement of said push member to cause the mirror support member to hinge about said hinge means, wherein the bearing member is provided at its outer end with an enlarged head which carries said hinge means, the axis of said hinge means being off-centre with respect to the axis of the passage throygh said bearing member, the mirror support member is provided with a skirt to cover a gap between the said head and said mirror support member in an outer position thereof and which is guided relative to the said head by co-operating guide means on the skirt and head, a spring acts between said head and said mirror support member to urge the latter towards its outer position, first and second friction washers co-operate respectively with the said head and with the inner end of the bearing member and the first control member to provide frictional resistance to turning of the bearing member and first control member, a mirror carrying arm is connected to said mirror support member, means connecting said mirror carrying arm to said mirror support member for enabling said mirror carrying arm to be moved relative to said mirror support member, the inner end of the bearing member is provided with a screw-thread onto which the first control member is screwed and secured in the desired position by a lock nut, and wherein the push member comprises a rod of which the inner end is provided with a screw-thread and the second control member is rotatable relative to the first control member but is held axially captive with the first control member by means of a rim of said second control member which is retained in a recess in an outer surface of the first control member by a retaining plate secured thereto, and the second control member has an internal thread in threaded engagement with the screw-thread on the inner end of the rod.

* * * * *